Oct. 28, 1947.  E. J. GOHR ET AL  2,429,751
SEPARATION OF GASES FROM SOLID PARTICLES
Filed Sept. 23, 1944
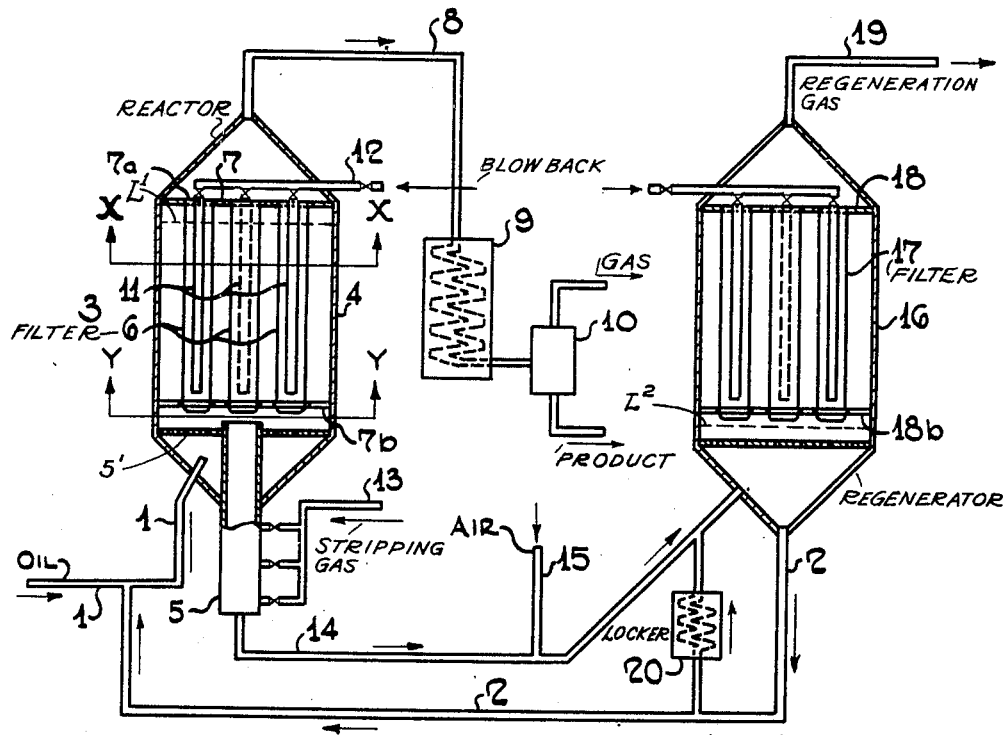
Fig.-1
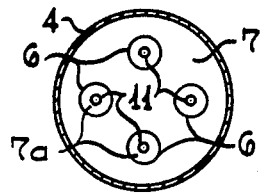 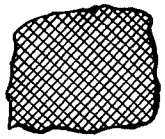 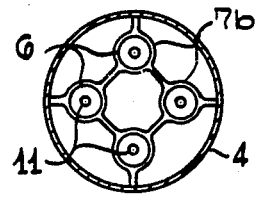
Fig.-2    Fig.-4    Fig.-3
Edwin J. Gohr
Roger W. Richardson  Inventors
By _____ Attorney Patented Oct. 28, 1947

2,429,751

UNITED STATES PATENT OFFICE 2,429,751

SEPARATION OF GASES FROM SOLID PARTICLES

Edwin J. Gohr, Summit, N. J., and Roger W. Richardson, Baton Rouge, La., assignors to Standard Oil Development Company, a corporation of Delaware Application September 23, 1944, Serial No. 555,484

4 Claims. (Cl. 196—52)

The present invention relates to improvements in processes employing "fluid-solid" or fluidized solid technique, and more especially to improved methods for reducing the losses of the finely divided solid when employed in petroleum conversion and other processes. The invention will be fully understood from the following description and the drawing.

In the drawing:

Fig. 1 is a semi-diagrammatic view in sectional elevation of a process for catalytic cracking of petroleum in which a solid catalyst is employed in a fluidized form. The solid is regenerated and returned for reuse. Means for reducing losses of the finely divided solid are shown and the operation of the process is fully illustrated;

Fig. 2 shows a section of the vessel 3 in Fig. 1, taken along the line $x$—$x$, looking upwardly, and Fig. 3 shows a similar section taken along the line Y—Y, also looking upwardly.

Fig. 4 shows a portion of the filter medium employed in the previous apparatus, indicating its nature as a textile.

Various processes have been used heretofore in which catalyst adsorbents have been used in a fluidized form, that is to say the catalyst is dispersed in a carrier gas or vapor so as to form a dense suspension which can be made to flow much as a liquid through the apparatus. In such processes the catalyst or other solid is in a finely powdered form and is usually produced by fine grinding of some earthy material, modified earthy material or synthetic material having the desired catalytic or other properties.

In a grinding operation, the materials are reduced to a small size and as might be expected the size varies quite widely so that it is expensive to specify close sizes, and in consequence of this, processes have been devised to employ catalyst or other solid of wide size-frequency distribution. As a further consequence, the solid recovery system is complicated. At the same time, the shape of the particles as produced by the grinding is quite irregular with sharp points, rough edges and irregular surfaces. One of the main problems presented in the utilization of fluid solid technique is, of course, the separation of the solid material from the vapors or gases and heretofore it has been done by the use of a system of cyclonic or centrifugal separators in series, usually followed by an electrostatic separator. Such equipment is bulky and expensive and it is found that the separation equipment is usually subject to more than normal wear. The catalytic material is also ground down at more than the normal rate in this equipment and it is evident that improvement in separation equipment is particularly desired.

It has now been found that catalysts or heat carriers can be produced in the form of minute, regularly shaped, nearly spherical particles and that the size can be narrowly controlled. By employing a proper size of the solid in this form, it has been found possible to greatly simplify the solid separation apparatus by the use of filtering or screening equipment. While various air filters have been available for many uses in the past, they have not been satisfactory in fluidized solid processes chiefly because of the wide range of the size-frequency distribution of the solid and the irregularity of the particle shapes and in consequence have not been used in any commercial apparatus so far as is known.

The present process is applicable to many different types and kinds of reactions, all of which, however, involve the treatment of a vapor with a solid in which the vapor is separated from the solid which is retreated by some means to prepare the solid for reuse. In this specification, the process described will be one of catalytic cracking of hydrocarbon oils to produce gasoline, but the method may be applied to various conversion processes, for example, to catalytic dehydrogenation, reforming, isomerization, alkylation with solid catalyst or the synthesis of hydrocarbons by reduction of carbon monoxide with hydrogen, and the oxidation or chlorination with aromatic hydrocarbons. The term "reaction" is also used in a broader sense, to include physical processes such as adsorption of one component from a mixture with others and the process thus applied consists of the adsorbing of the desired material in one stage of the process and the separation of the adsorbed material in a secondary stage so that the mixture is finally resolved.

Referring to the drawing, in Fig. 1 the numeral I denotes a feed line through which oil, either in vapor or liquid phase, is fed to the process. Before or at the entrance into the reactor 3, this oil is admixed with a stream of fluidized, finely divided catalyst of a particular type disclosed above, being uniform in size and spherical in form. The catalyst or treating agent is fed by means of a pipe 2.

The reactor consists of a tall vessel with an upper cylindrical portion 4 of a larger diameter and a lower portion of smaller diameter denoted by the numeral 5. The catalyst or solid agent is maintained in a fluidized condition within the reactor by maintaining the upward velocity of from about .5 to 8 feet per second approximately, depending upon the size of the solid as will be disclosed below. The reactor is provided with a perforated distribution grid member 5' in its lower portion.

A rather well defined level indicated at L' of the fluidized mixture is maintained within the reactor, above which the suspension is markedly less dense than therebelow, and the solid swirls around mixing rapidly and giving the appearance of a rapidly boiling liquid.

In the upper portion of the reactor 3, a cross-sectional plate or septum 7 is provided and from this plate filter bags or stockings 6 are hung closely fastened to the plate and around holes 7a cut therein. This is best shown in Fig. 2 which is a cross-sectional view of the reactor. While the filters may be hung well above the so-called level, it is preferred to allow them to hang downwardly into the denser suspension below the level indicated at L' and they may be kept in place by fastening the closed lower ends to a spider 7b in the lower part of the cylindrical vessel 4. The arms of the spider are attached firmly to the side walls of the vessel. This is most clearly shown in Fig. 3 which is likewise a sectional view.

From the above description it will be understood that the vapors generated within the reaction vessel and in contact with the catalytic elements pass through the filter bags 6 into the interior of the filters, then through the holes 7a in the plate 7 and thence by the vapor pipe 8 to a condenser 9 and a receiver 10.

Within the filter elements, blow-back pipes 11 are provided which may be fed with steam or other inert gas from the valved feed pipe 12 and the flow to each of the separate blow back pipes may be controlled by separate valves, which are shown diagrammatically. These pipes are used to clear the filters from time to time should they appear to be clogged with small particles of broken or worn catalyst.

The fluidized solid fills a large part of the vessel 4 and completely fills the lower portion 5 into which gas is introduced by means of a pipe 13. This serves to strip the reaction products from the solid which has accumulated cokey materials and its activity is therefore diminished. This material which will be denoted as spent catalyst is withdrawn in a fluidized condition through the pipe 14. Air is fed by a pipe 15 and is admixed with fouled catalyst as or just before the mixture passes into the regenerator which is shown generally at 16. The regenerator is a cylindrical vessel somewhat similar to vessel 3 being fitted with the filters 17 arranged on the upper plate 18 and held by a lower spider 18b, just as in vessel 3 except that for illustrative purposes the level is indicated below the filters as at $L^2$ in the drawing. The catalyst in the regenerator is maintained in a fluidized condition and the combustion of the carbon by means of the added air occurs in the regenerator. Combustion products pass through the filters 17 and finally out by the vent pipe 19. The catalyst is withdrawn from the lower part of the regenerator by means of the pipe 2 and is recirculated thereby to the reactor 3. A portion of the catalyst withdrawn from the regenerator 16 may be cooled in the exchanger 20 and recirculated back to the regenerator. By this means its temperature may be controlled.

In the operation of the particular process, the reaction conditions naturally depend on the particular reaction which is to be carried out. In the case of catalytic cracking of hydrocarbons to form gasoline, the reactor is preferably maintained at 700° to 1000° F., at normal pressure or somewhat higher. The regenerator is at a temperature of say 1000 to 1200° F., and in any case the catalyst or the solid treating agent will not pass through the filter elements and the separation of the catalyst from the reaction products is effected in this manner. As indicated before, other reactions require different conditions. If the catalyst or solid treating agent is of such a nature that it does not require regeneration, then only one stage of the process need be used. This may be the case in the oxidation of aromatic hydrocarbons, for example, naphthalene to form phthalic anhydride. The catalyst, vanadium oxide, can be used over and over again and may be maintained in the single reactor 3, without withdrawal. It is advantageous, however, to withdraw a stream of the catalyst, cool it and return it to the reaction vessel in the same manner as indicated for the purpose of cooling the regeneration vessel. In other cases the two stages of the process are employed, the one for effecting the particular reaction and the other for repreparing the solid for further use.

In the present invention, the separation of the catalyst by means of filters comprises an important feature. Such separation is quite unsatisfactory where ordinary crushed solid particles are used and the successful operation of the present invention depends not only on the nature of the filters but also on the particular size and shape of the catalyst or solid material used. With ordinary crushed or ground solids, the filters are plugged so rapidly that their capacity is quite inadequate. This is presumably due to the wide variation in size of the solid particles and the irregularity of their form. With the present catalyst disclosed above, wear occurs only at a low rate and the particle sizes are regular and can be controlled to the proper size so that filtration can be effected with little plugging.

The nature of the filter elements is of considerable importance. These may be produced from porous solids, for example, hollow cylinders made up of alundum or compressed carbon particles, but woven fabrics are preferred, for example, woven from glass fiber or metallic wires. Certain fibers, of course, do not have great mechanical strength, particularly at the high temperatures and in that case they may be backed up by large mesh screens of stronger materials either on the one or both sides of the filter medium. The chemical nature of the reactants and the temperature conditions necessarily have to be considered carefully when choosing the particular filter medium. Where the material treated is corrosive, this must be considered. For example, in the case of high sulfur oils, high melting glass fibers or alloys of chromium and nickel will serve the purpose best. These alloys consist of 8 to 20% nickel with 18 to 25% chromium.

The size of the pores or mesh should also be somewhat smaller than the particular solid particle size employed. Suitable sizes for different particle sizes are given in the table below:

| Particle Size | Meshes to the Inch |
|---|---|
| 40 to 100 microns | 325 |
| 100 to 300 microns | 150 |
| 300 to 900 microns | 48 |
| 700 to 1000 microns | 24 |

The filters may be hung or suspended entirely within the free space above the so-called level within the reactor, but it is found most desirable to immerse them in the denser suspension, that is below the level since it has been found that the movement of the solid particles appears to actually prolong the freedom from plugging.

It will be understood that the blow-back pipes provided within the filters comprise only one of the methods by which the screen plugging can be dealt with. The filter bags may, of course, be shaken mechanically or caused to vibrate by mechanical, electrical or magnetic means.

The manufacture of the catalyst is no part of the present invention but it is desirable to briefly outline one method by which suitable catalysts can be made. Most of the catalysts are prepared by impregnation of a suitable gel base which may be a gel of silica, alumina or related materials or a mixed gel base such as silica and alumina. Such material may be used alone for certain purposes but for others it is impregnated with suitable catalytic promoters.

In preparing the gel base, a sol of silica or other suitable material may be produced which will set in a period of 1 to 45 minutes. This sol, which it will be understood is in liquid form, can be produced by well known means and need not be specifically described. In any case, the sol is emulsified in a suitable non-miscible medium, preferably a hydrocarbon oil, and in the presence of a suitable surface active agent to assist in forming an emulsion in which the sol is in the internal or dispersed phase. The sol particles are distributed by agitation and the degree of agitation is the principal factor in determining the particle size. When the emulsion has been produced and is homogenized to the proper size, it is allowed to stand, that is to say with gentle agitation so as to prevent coalescence of the particles, until it has solidified into a gel which may then be separated from the oil by sedimentation or otherwise. Thereafter the gel is impregnated and dried or activated for the particular service desired.

Such sols prepared from silica will automatically set but in other instances, for example with alumina, the sol ordinarily does not set without a change or adjustment of the pH and this must be done by adding a suitable alkaline agent to the oily medium to effect the change in pH and to cause setting as desired.

It is found that spherical particles have a great many advantages over the ordinary irregularly shaped particles which are produced by fine grinding. In passing through the apparatus, it is found that they do not erode the equipment to any substantial degree that is objectionable nor are they worn away nearly so quickly by attrition. The hydrocarbon components of the catalyst may be more readily stripped therefrom by the passage of a suitable inert gas and while these are all important advantages, probably the most important advantage lies in the simplicity of separation of the solid from a gaseous vehicle. Separation can, of course, be effected by the use of centrifugal separators, such as employed at the present time, but it is found possible also to eliminate this equipment entirely as well as the electrostatic separators if suitable filters of the types described above are employed. It is found that these spherical catalysts are separated with great ease by means of filters and that they do not plug the cloth filter which has been the chief objection to the irregularly shaped catalysts produced by grinding. The other advantages found in the use of these catalysts in fluid catalysts operations will be apparent to those skilled in the art.

Throughout the present specification, the term "fluidized" has been used to describe the condition of the catalyst when suspended in vapor or liquid. This term is believed to be understood fully at the present time and refers to a dense suspension of the finely divided solid in gas or vapor. The amount of gas or vapor may be quite small and the suspension has the appearance of a liquid which boils or swirls around in the reactor and even shows what appears to be separate phases, a denser one below and a lighter one above, with a rather well defined interface between which has been referred to as a level. The fluidized material exhibits dynamic and static heads just as a liquid, and the only consequence of adding further gas or vapor to a fluidized mixture is to decrease the density of the suspension. This provides a convenient method for causing streams of the fluidized material to flow from one vessel to another, as in the drawing, without the use of any pumps or the like operating on the dust laden fluids themselves. It will be understood that each of the flow lines connecting the two vessels shown consists of a U-tube. Gas or vapor is added to the downstream side of the U decreasing the density of the suspension in that leg of the tube so that "hydrostatic" pressure in the upstream leg causes the desired flow. Each section of the apparatus in the drawing must be considered with this point in view and the densities of the opposing columns of fluidized material are adjusted so as to generate an unbalanced pressure, sufficient to overcome the friction of flow.

As an example of this, the density of the suspension as a maximum will be of the order of 25 pounds or more per cubic foot where clay or gel type catalysts are used. The catalyst itself has a true density of about 45 pounds per cubic foot. In the downstream leg of the U-tube additional gas may be added so as to decrease the bulk density of the suspension to say 15 pounds per cubic foot. There is thus a difference of 10 pounds per square foot for each foot of head and the total head may be increased as desired to overcome frictional resistance by extending the length of the U-tube legs.

In order to maintain fluidized conditions within the reactor, the upward velocity should vary from about .5 to 8 feet per second, depending principally on the size of the catalyst. With catalysts ranging from 40 to 500 microns, the velocity will range from about .5 to 5 feet per second; with larger sizes, say ¼" to ½" in diameter, the velocity would be from about 4 to 8 feet per second. In choosing the catalyst, it is preferable in the range given above, that is from 40 microns to ¼" to ½" diameter, and not less than about 90% of the catalyst should fall within a range of one to threefold in diameter which is quite narrow in respect to the catalyst heretofore used and prepared by grinding. For example, the catalyst may have narrow ranges, namely, from 40 to 150, from 100 to 300, 300 to 900 and 700 to 1000 microns in diameter or from say ¼" to ½".

As specific examples of the method by which these catalysts are prepared for the present process, the following may be considered:

*Example I*

One volume of a silica sol prepared from equal volumes of sulfuric acid, specific gravity 1.19, and sodium silicate, specific gravity 1.21, was dispersed in 10 volumes of mineral seal oil containing 0.0135 cc. of an emulsifying agent, per gallon. The mixture was agitated in a 5 gallon Turbomixer at 160° F. until the sol had set. The hydrogel was then washed free of soluble ions and dried in boiling butanol. Since the material set in emulsified form, it had assumed the form of small spherical particles. A sample of this material was analyzed for particle size distribution by the standard microscopic method which consists of measurement of the diameter of a particle whose image has been projected upon a screen. The data are given as follows:

| Micron size | Per Cent Frequency Basis |
|---|---|
| 133–160 | 0.32 |
| 160–185 | 0.65 |
| 185–213 | 0.33 |
| 213–240 | 1.9 |
| 240–266 | 3.0 |
| 266–293 | 5.5 |
| 293–320 | 6.1 |
| 320–373 | 14.0 |
| 373–427 | 21.6 |
| 427–480 | 17.8 |
| 480–533 | 11.8 |
| 533–586 | 9.6 |
| 580–640 | 3.6 |
| 640–693 | 3.3 |
| 693–800 | 0.3 |
| 800–840 | 0.2 |

From the above it will be noted that more than 95% of the material had a diameter between the limits of 240 and 700 microns.

*Example II*

12 gallons of a silica sol prepared as indicated in the previous example were dispersed in 130 gallons of mineral seal oil containing 2 cc. of the same emulsifying agent. The mixture was agitated in a 200 gallon vessel and was rapidly stirred. The temperature was held at 130° F. until the sol had set.

The hydrogel prepared as above was washed free of soluble ions and then was impregnated by soaking alternately in a solution of aluminum sulphate and ammonium hydroxide. It was then rewashed and dried and the catalyst contained about 18% of $Al_2O_3$ on the dry basis. The material was a highly active silica-alumina gel catalyst and was obtained in spherical form. An analysis was given as in the previous example which showed the following size-frequency distribution:

| Micron Size | Per Cent Frequency Basis |
|---|---|
| 10–15 | 0.6 |
| 15–20 | 1.6 |
| 20–30 | 13.4 |
| 30–40 | 38.0 |
| 40–50 | 24.0 |
| 50–60 | 14.7 |
| 60–70 | 6.4 |
| 70–80 | 1.3 |

About 90% of this material is a particle size between 20 and 60 microns diameter.

*Example III*

12 gallons of a silica sol made up as above were dispersed in 130 gallons of mineral seal oil containing 0.25 cc. of the same emulsifying agent per gallon. The mixture was agitated at 120° F. in a 200 gallon vessel using an Anchor type stirrer run at 90 R. P. M. This was continued until the sol had set.

The hydrogel in spherical form was then washed free of soluble ions, reimpregnated with alumina by alternate washing with aluminum sulphate and ammonium hydroxide solutions as indicated above. It was then rewashed and dried in boiling butanol. This catalyst contained 17.7% alumina on a dry basis and the size-frequency analysis was as follows:

| Micron Size | Per Cent Frequency Basis |
|---|---|
| 40–50 | 0.32 |
| 50–60 | 2.9 |
| 60–70 | 4.5 |
| 70–80 | 8.0 |
| 80–90 | 9.0 |
| 90–100 | 13.2 |
| 100–120 | 27.0 |
| 120–140 | 13.5 |
| 140–160 | 11.6 |
| 160–180 | 4.2 |
| 180–200 | 2.6 |
| 200–220 | 2.2 |
| 220–240 | 1.0 |

From the above analysis it will be seen that the material contained 90% of particles having diameters between 60 and 180 microns in diameter.

In order to more clearly illustrate the advantages of the present process, the following tests were made to demonstrate the action of the catalysts in a fluid system involving separation by the use of filters.

*Example IV*

Separate 100 cc. samples of certain catalysts were placed in a glass tube which was fitted at the bottom with an aeration tube by which a controlled and measured quantity of air could be passed into the bottom of the tube. At the top of the tube a filter was placed. This filter consisted of a Whatman double thick, seamless, cellulose extraction thimble. Aeration gas, containing the powder which was carried up into the thimble, passed through the pores in the thimble and found its way out free of the solid material which was left either in the pores of the filter or dropped back into the tube. The tests were conducted by placing equal volumes of different powdered materials in the vertical glass tube, blowing gas into the bottom at a rate of five feet per second which was sufficient not only to fluidize the powder but also to blow it up into the filter thimble. Measurements of pressure drop through the apparatus were then taken and the increase in pressure drop was recorded for various intervals of time which indicated the rate and degree at which the filter became plugged.

The first material employed in the above tests was a standard ground catalyst of the type hitherto used in catalytic cracking operations. The size-frequency distribution of the catalyst is shown by the following roller analysis:

| Micron Size | Per Cent Frequency Basis |
|---|---|
| 0–10 | 16.4 |
| 10–15 | 6.0 |
| 15–20 | 2.4 |
| 20–30 | 9.3 |
| 30–40 | 11.3 |
| 40–50 | 7.6 |
| 50–60 | 7.9 |
| 60–70 | 6.4 |
| 70–80 | 9.1 |
| 80–100 | 5.5 |
| 100–120 | 3.0 |
| 120–140 | 6.8 |
| 140–160 | 3.5 |
| 160–180 | 3.5 |
| 180–200 | 0.4 |

It will be seen from the test that the material ranged in size from below 10 to above 200 microns diameter. The particles were of irregular shapes, not spherical.

The second sample employed was a spherical catalyst similar to those prepared in Examples I to III above, having an average particle size of 60 microns with more than 90% falling within the range of three-fold in diameter. The third sample was similar but with an average particle diameter of 200 microns. The fourth sample was again similar but with an average particle size of 80 microns and a fifth sample had an average size of 120 microns.

In the table below, the data collected in the filtration tests are shown. In the first column is the designation of the samples just described. The second column gives a description of the sample and the third and fourth columns show the per cent increase in back pressure during the test.

| Sample No. | | Time, Min. | Per Cent Increase in Back Pressure During Test | Per Cent Collected in Filter |
|---|---|---|---|---|
| 1 | Ground Catalyst Wide size and distribution | 0 | | |
| | | 10 | 15.8 | |
| | | 25 | 35.8 | |
| | | 30 | 42.0 | |
| | | 35 | 43.0 | |
| | | 40 | 43.0 | 18.8 |
| 1 | Check Test | 0 | | |
| | | 10 | 9.7 | |
| | | 25 | 28.4 | |
| | | 30 | 36.9 | |
| | | 35 | 38.9 | |
| | | 45 | 43.0 | |
| | | 50 | 44.0 | |
| 2 | Spherical Catalyst Narrow size distribution—average diameter 60 microns | 45 | 0 | 14.7 |
| 2 | Check test | 45 | 0 | |
| 3 | Spherical Catalyst narrow size distribution—average diameter 200 microns | 40 | 0 | 1.0 |
| 4 | Spherical Catalyst narrow size—distribution—average diameter 80 microns | 30 | 0 | 9.4 |
| 5 | Spherical Catalyst narrow size distribution—average diameter 120 microns | 45 | 0 | 14.9 |

From the above tests it will be observed that the ground sample of catalyst having a wide size-frequency distribution rapidly built up pressure so that it increased by about 45% in 40 to 50 minutes. The spherical catalysts could be run in the same apparatus and under the same conditions for periods of 45 minutes, showing no increase whatever in back pressure, thus indicating that these materials did not plug the filter under these conditions.

We claim:

1. An apparatus for contacting solids with gaseous fluids which includes a vertical reactor, a perforated distribution grid member in the lower portion of said reactor, means for introducing solids of substantially uniform spherical shape into said reactor, means for introducing gaseous fluid for passage upwardly through said grid member and into said reactor at a velocity to form a dense fluidized mixture of solids in said reactor, a plurality of filter elements within said reactor and extending into the dense fluidized mixture whereby gaseous fluid passes from the dense fluidized mixture through said filter elements which hold back the spherical particles, a pipe for withdrawing filtered gaseous fluid from said filter elements, a separate withdrawal pipe communicating with the lower portion of said reactor for withdrawing fluidized spherical particles from said reactor and means for introducing fluidizing gas into said last-mentioned withdrawal pipe for maintaining the withdrawn particles in fluidized condition.

2. Apparatus according to claim 1 in which said filter elements are in the form of bags or stockings composed of finely woven heat-resistant fibers.

3. In a process employing fluidized solid treating agent wherein the solid particles are contacted with a reactant vapor in a vertical contacting zone and the solid particles are subsequently separated from the vapor, the improvement which comprises introducing solid particles of substantially uniform size and spherical shape into said contacting zone, introducing reactant vapor into the bottom portion of said contacting zone and passing it upwardly through said zone at a velocity between about 0.5 and 8.0 feet per second adapted to the average particle size to maintain the solid particles in a dense fluidized liquid-simulating phase having a level in said contacting zone with a less dense suspended particle phase thereabove, withdrawing dense fluidized solid treating agent from the dense phase in said contacting zone, conducting vapors from said dense fluidized solid particle phase through the meshes of a finely woven fabric arranged to extend into the dense fluidized phase in said contacting zone and then withdrawing filtered gaseous fluid substantially free of solid treating agent from said contacting zone.

4. In a process employing fluidized solids wherein solid particles are contacted with a gaseous fluid in a vertical contacting zone and the solid particles are subsequently separated from the gaseous fluid, the improvement which comprises introducing solid particles into said contacting zone, introducing gaseous fluid into the bottom portion of said contacting and passing it upwardly through said zone at a velocity between about 0.5 and 8.0 feet per second to maintain the solid particles in a dense fluidized liquid-simulating phase having a level in said contacting zone with a less dense suspended particle phase thereabove, withdrawing dense fluidized solid particles directly from the dense phase in said contacting zone, conducting gaseous fluid from said dense fluidized solid particle phase through the openings in a filter element arranged to extend into the dense fluidized phase in said contacting zone and withdrawing filtered gaseous fluid substantially free of solid particles from said contacting zone.

EDWIN J. GOHR.
ROGER W. RICHARDSON.

(References on following page)

REFERENCES CITED

The following references are of record in the file of this patent:

UNITED STATES PATENTS

| Number | Name | Date |
|---|---|---|
| 836,056 | Staples | Nov. 13, 1906 |
| 1,577,534 | Miller | Mar. 23, 1926 |
| 1,843,639 | Hansen | Feb. 2, 1932 |
| 2,285,804 | Campbell et al. | June 9, 1942 |
| 2,292,708 | Mavity | Aug. 11, 1942 |
| 2,304,128 | Thomas | Dec. 8, 1942 |
| 2,340,878 | Holt et al. | Feb. 8, 1944 |
| 2,366,372 | Voorhees | Jan. 2, 1945 |
| 2,325,136 | Kassel | July 27, 1943 |
| 2,328,773 | Benedict | Sept. 7, 1943 |
| 2,348,576 | Seguy | May 9, 1944 |
| 2,373,358 | Upham et al. | Apr. 10, 1945 |
| 2,387,596 | Marisic | Oct. 23, 1945 |

FOREIGN PATENTS

| Number | Country | Date |
|---|---|---|
| 21,560 | Great Britain | Feb. 10, 1910 |
| 23,045 | Great Britain | Aug. 24, 1911 |
| 533,037 | Germany | Sept. 8, 1931 |